United States Patent
Lee et al.

(10) Patent No.: US 8,132,771 B2
(45) Date of Patent: Mar. 13, 2012

(54) PORTABLE SPACING MEMBER

(75) Inventors: Richard H. Lee, St. Louis, MO (US); Terry Staed, St. Louis, MO (US); Paul W. Baker, Cambridge, OH (US); Thomas M. Quinn, New Concord, OH (US)

(73) Assignee: Anheuser-Busch Companies, Inc., St. Louis, MO (US)

( * ) Notice: Subject to any disclaimer, the term of this patent is extended or adjusted under 35 U.S.C. 154(b) by 0 days.

(21) Appl. No.: 11/506,038

(22) Filed: Aug. 17, 2006

(65) Prior Publication Data

US 2007/0041805 A1  Feb. 22, 2007

Related U.S. Application Data

(60) Provisional application No. 60/709,063, filed on Aug. 17, 2005.

(51) Int. Cl.
  *B65D 19/38* (2006.01)
(52) U.S. Cl. ............. 248/346.02; 248/346.01; 108/53.1; 108/55.3; 211/49.1
(58) Field of Classification Search ............. 248/346.01, 248/346.02, 346.06, 346.03, 68.1; 108/57.25, 108/57.26, 58, 51, 53, 56.1, 57.1, 53.1, 53.3, 108/55.1, 55.3, 51.11; 52/793.1, 430, 569; 206/503, 514–519; 211/49.1, 59.4, 194
See application file for complete search history.

(56) References Cited

U.S. PATENT DOCUMENTS

| | | | |
|---|---|---|---|
| 2,699,912 A * | 1/1955 | Cushman | 108/56.1 |
| 3,424,108 A | 1/1969 | Vargen | |
| 3,464,367 A | 9/1969 | Latter | |
| 3,593,671 A | 7/1971 | Bramlett | |
| 3,618,535 A | 11/1971 | Hees | |
| 3,680,496 A * | 8/1972 | Westlake, Jr. | 108/57.26 |
| 3,696,761 A * | 10/1972 | Brown | 108/53.3 |
| 3,824,933 A * | 7/1974 | Lind | 108/56.1 |
| 3,854,426 A | 12/1974 | Kinnune, Jr. | |
| 3,868,915 A * | 3/1975 | Hafner | 108/57.26 |
| 4,109,587 A | 8/1978 | Jansen, Jr. | |
| 4,316,419 A * | 2/1982 | Cupido | 108/56.1 |
| 4,363,579 A | 12/1982 | Rogers | |
| 4,372,717 A | 2/1983 | Sewell et al. | |
| 4,386,881 A | 6/1983 | Liebel | |
| 4,494,897 A | 1/1985 | Rogers | |
| 4,799,433 A * | 1/1989 | Luft | 108/57.26 |
| 4,865,889 A | 9/1989 | Boyse | |
| 5,072,901 A * | 12/1991 | Scott | 248/49 |
| 5,132,156 A | 7/1992 | Trassare, Jr. et al. | |
| 5,306,100 A | 4/1994 | Higginbotham | |
| 5,404,829 A * | 4/1995 | Shuert | 108/57.26 |
| 5,409,755 A | 4/1995 | Lo Presti et al. | |
| 5,418,038 A | 5/1995 | Wise et al. | |
| 5,484,643 A | 1/1996 | Wise et al. | |
| 5,486,078 A | 1/1996 | Wise et al. | |
| 5,555,820 A * | 9/1996 | Shuert | 108/57.25 |
| 5,606,921 A * | 3/1997 | Elder et al. | 108/53.3 |
| 5,855,459 A | 1/1999 | Krier et al. | |
| 6,006,677 A * | 12/1999 | Apps et al. | 108/57.25 |
| D513,104 S * | 12/2005 | Harding et al. | D34/38 |
| 7,441,731 B2 * | 10/2008 | Smart et al. | 248/74.1 |
| 2007/0045482 A1 * | 3/2007 | Smart | 248/68.1 |

* cited by examiner

*Primary Examiner* — Tan Le
(74) *Attorney, Agent, or Firm* — Storm LLP; Paul V. Storm

(57) ABSTRACT

During shipping, it is not uncommon to have loads shift in transit. To help alleviate this problem, a portable bulkhead or spacing system is provided. The system is nestable for easy storage, lightweight, durable, and cost effective. The combination of these factors, thus, allows for shipping efficiencies to drastically increase so that products can be effectively shipped resulting in an overall lower cost to the consumer and generating an advantage over competition.

10 Claims, 4 Drawing Sheets

PORTABLE SPACING MEMBER

CLAIM OF PRIORITY

This application claims priority to U.S. Provisional Application No. 60/709,063, entitled "A PORTABLE SPACING MEMBER" filed on Aug. 17, 2005, which is hereby incorporated by reference for all purposes.

TECHNICAL FIELD

The invention relates generally to a portable bulkhead system and, more particularly, to a nestable, lightweight, and storable spacing system.

BACKGROUND OF THE INVENTION

Oftentimes during shipping, cargo included within a shipping container, such as a trailer, does not consume the entire volume of the container. Having empty space within shipping containers can be a significant problem in that shipping containers are in motion, with almost continuous stopping, starting, and changing directions. These accelerations can, thus, cause the cargo within the shipping containers to shift in transit. This inadvertent shifting of cargo can cause severe damage to the cargo being shipped, especially if the cargo is fragile, like glass products. However, the inclusion of heavy volumetric spacing members are not particularly practical because storage of the spacing members can be difficult and because the cost of shipping can be substantially increased due to the weight of the spacers. Therefore, there is a need for a method and/or apparatus for a lightweight and portable spacing member system that assists in preventing shifting of cargo within a shipping container in transit.

SUMMARY

The present invention, accordingly, provides a system for spacing comprising at least one pair of parallel planar members having a plurality of interlocking pairs of substantially hollow members of a selected shape extending therebetween to maintain a selected distance between the planar members.

In another preferred embodiment of the present invention, there are a plurality of spacing members. Each spacing member comprises a planar member having a first side and an opposite second side. Additionally, each spacing member comprises a plurality of frustums extending from the first side of the planar member and terminating at an upper plane that is substantially parallel to the planar member, wherein each frustum includes at least one slot formed in an upper surface bordered by the upper plane.

In yet another preferred embodiment of the present invention, the hollow members are substantially conical frustums, and another preferred embodiment includes or comprises frustums that have a corrugated frustoconical surface.

An alternative, preferred embodiment of the present invention is a system comprising at least one pair of spacing members that face one another. Each spacing member includes or comprises a planar member having a first side and an opposite second side. Additionally, each spacing member comprises a plurality of frustums extending from the first side of the planar member and terminating at an upper plane that is substantially parallel to the planar member, wherein each frustum includes at least one slot formed in an upper surface bordered by the upper plane.

In yet another alternative preferred embodiment, a spacing member is provided. In the spacing member, there is a planar member having a first side and an opposite second side. Additionally, there is a plurality of frustums extending from the first side of the planar member and terminating at an upper plane that is substantially parallel to the planar member, wherein each frustum includes at least one slot formed in an upper surface bordered by the upper plane.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
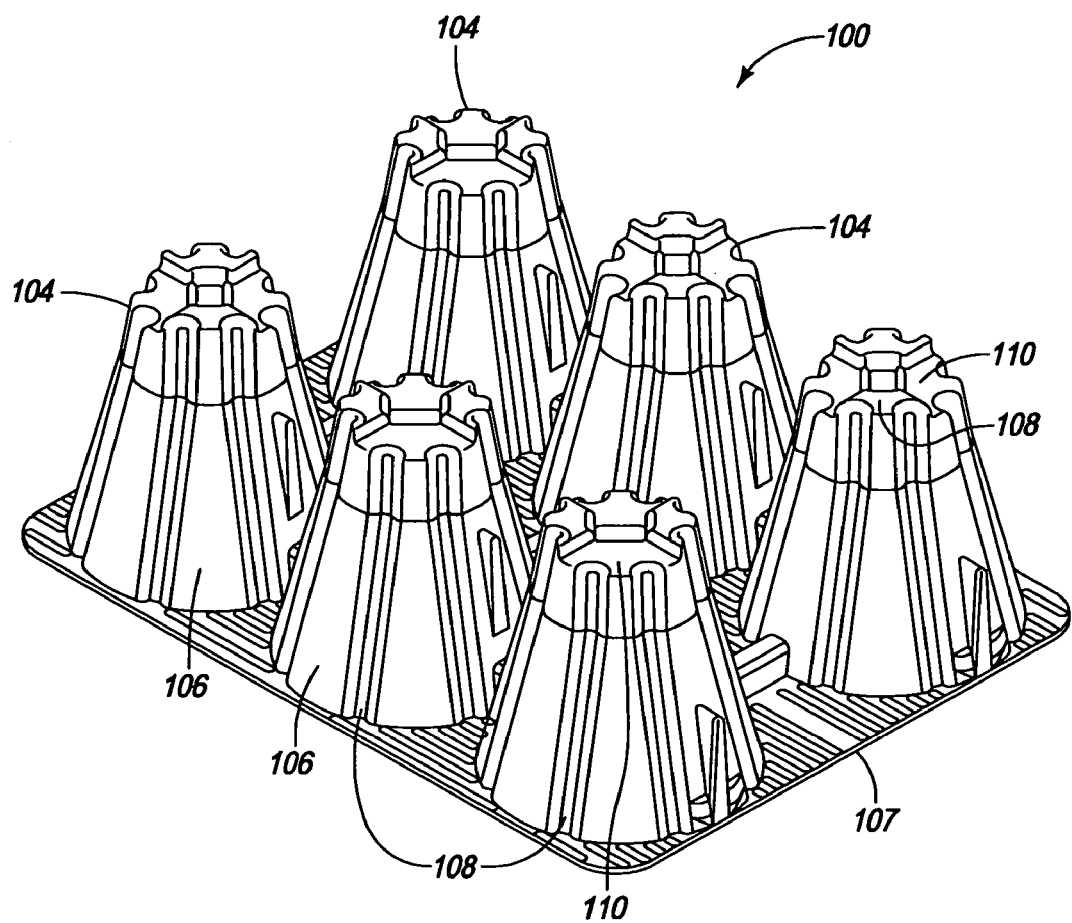
FIG. 1 is an isometric view of a spacing member embodying features of the present invention.
Figure 2:
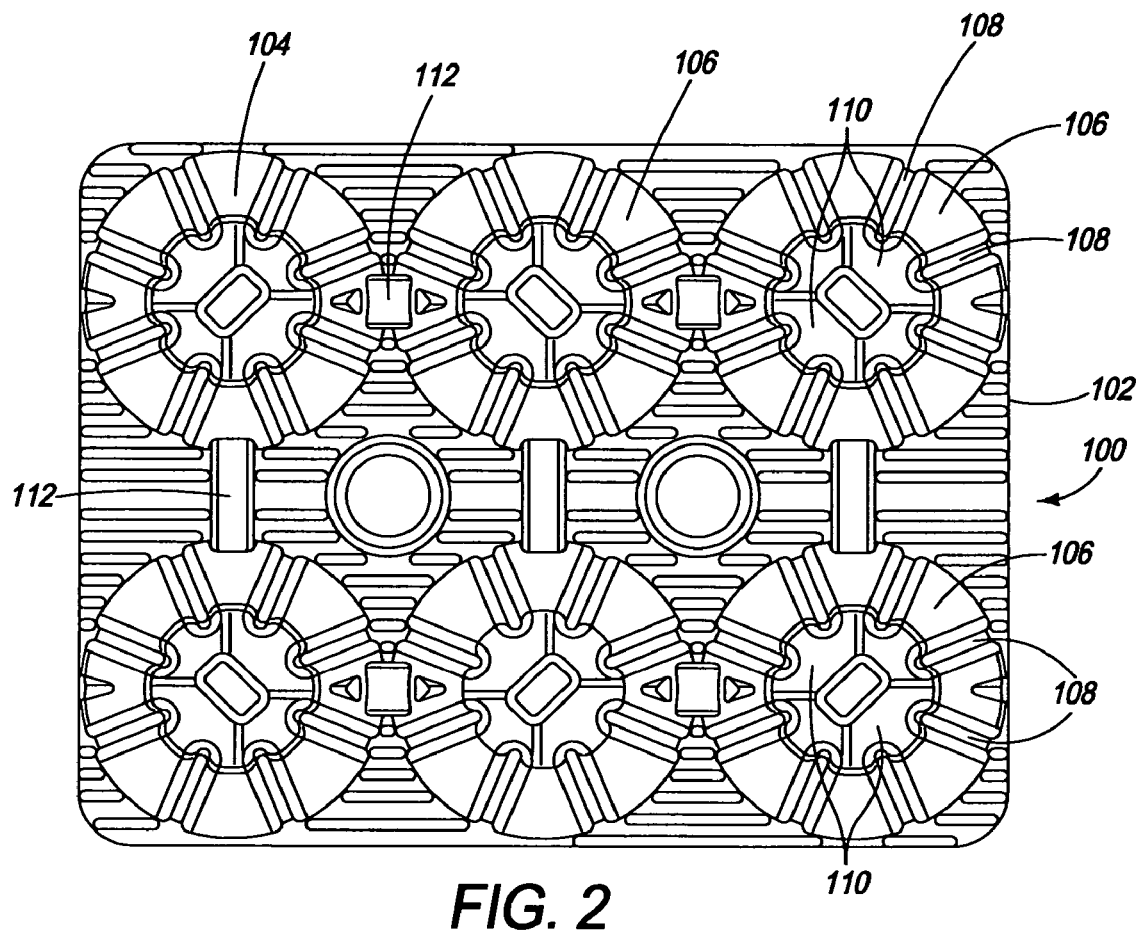
FIG. 2 is a top view of the spacing member of FIG. 1.
Figure 3:
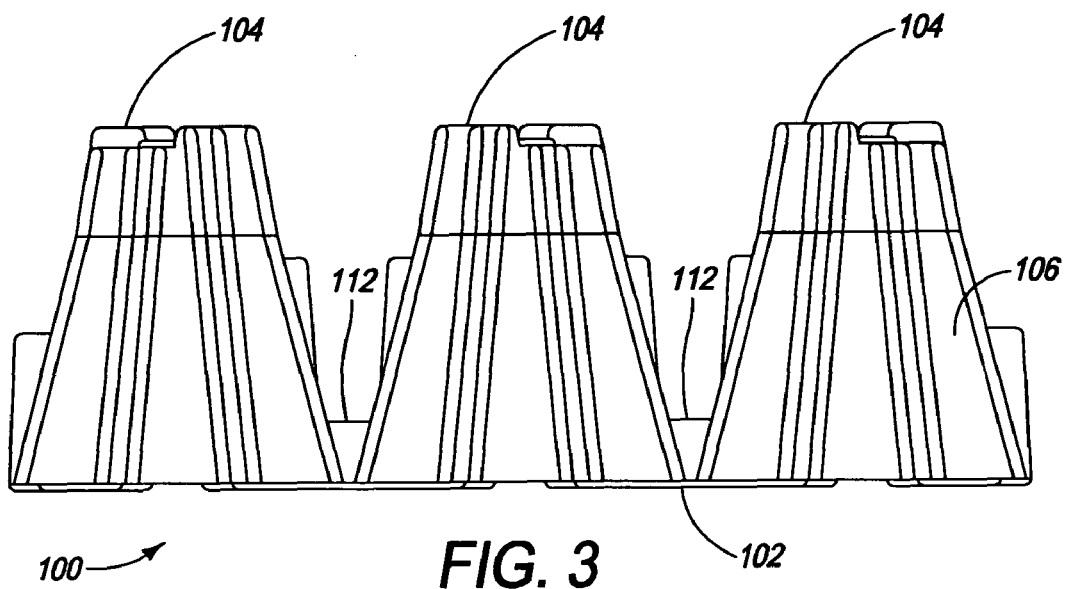
FIG. 3 is a side view of the spacing member of FIG. 1.
Figure 4:
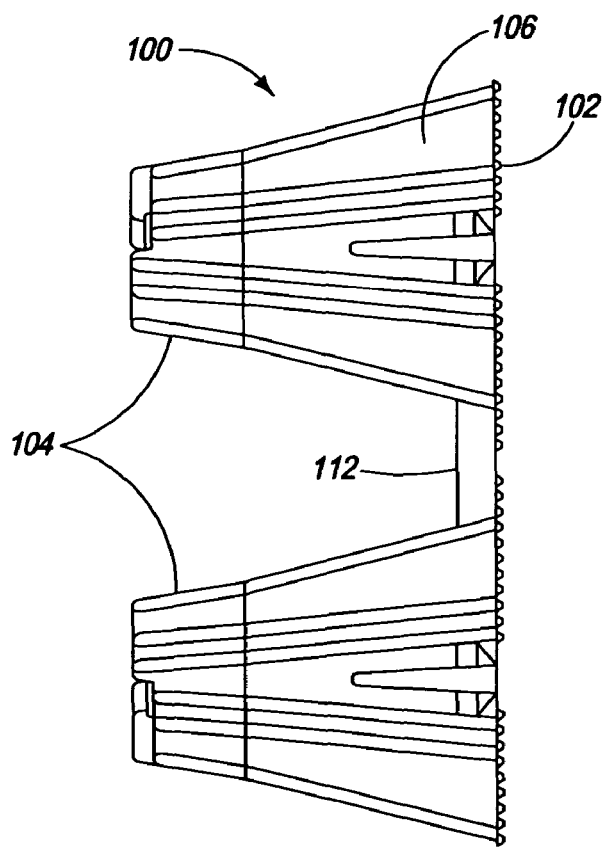
FIG. 4 is a front view of the spacing member of FIG. 1.

Refer now to the drawings wherein depicted elements are, for the sake of clarity, not necessarily shown to scale and wherein like or similar elements are designated by the same reference numeral through the several views.

Referring to FIGS. 1-4 of the drawings, the reference numeral 100 generally designates a spacing member embodying features of the present invention. The spacing member 100 comprises a planar member 102, conical frustums 104, frustoconical surfaces 106, corrugations 108, slots 110, and a cross member 112.

In normal shipping operations, palletized loads are often placed within the shipping containers. Various types of cargo and products are secured to pallets for easy loading and unloading of the cargo. Oftentimes these palletized loads can also be very heavy, potentially weighing in excess of 1 ton. These palletized loads, though, are not immune from shifting, even though they may be heavy.

To combat the problems of motion during shipping, the spacing member 100 is employed. The spacing member 100 can operate alone or in combination with other spacing members 100 to form bulkheads. Additionally, the spacing member 100 is typically made of a lightweight material, such as certain plastics or polymers like a high density polyethylene. By utilizing lightweight materials, the spacing members 100 can be easily manufactured at very low costs through techniques like injection molding or vacuum forming. For use with shipping applications, the spacing members 100 measure about 48.375 inches by about 36.375 inches by about 16.5 inches. Typically, these spacing members 100 are thermoformed from a high density polyethylene sheet having an approximate thickness of 0.390 inches prior to thermoforming, weighing about 26.5 pounds.

As can be seen in FIGS. 1-4, the base of the spacing member 100 is a planar member 102. This planar member 102 is typically corrugated to provide additional strength and resistance to compressive and torsional loads. The planar member 102, though, by itself, does not provide sufficient volume to resist the motion of cargo. According to a preferred embodiment of the present invention, hollow structures (conical frustums 104) are formed through the techniques like thermoforming in the planar member 102.

The use of the structures protruding from the planar member 102 allow for an expansive volume of the spacing member 100. As shown in FIGS. 1-4, extending in a direction away from the planar member 102 are a plurality of conical frustums 104 that are reinforced by cross members 112 that interconnect the plurality of conical frustums 104. Each of the conical frustums 104 narrows as a function of the distance from the planar member 102, and each of the conical frustums 104 terminates at a relatively uniform distance from the planar member 102. In other words, each of the conical frustums 104 terminates at a plane that is approximately parallel to the planar member 102. In the case where hollow structures protrude from both sides of the planar member 102, two approximately parallel planes can be utilized to illustrate termination of the conical frustums 104. Moreover, it is also possible to have conical frustums terminate at different relative distances to yield either a staggered or stepped configuration. Furthermore, any of the planes can be at an angle to the planar member 102 in other embodiments.

As can also be seen in FIGS. 1-4, the conical frustums 104 include a frustoconical surface 106 that is non-uniform. In particular, corrugations 108 are included within each frustoconical surface 106. The inclusion of the corrugations 108 within each frustoconical surface 106 allows for increased strength and rigidity. Typically, the corrugations 108 run in a direction orthogonal to the planar member 102 along the entire frustoconical surface 106. Moreover, the use of the corrugations 108 is not limited to frustoconical surfaces 106, but can also be employed on the surface of any other shape utilized.

Figure 5:
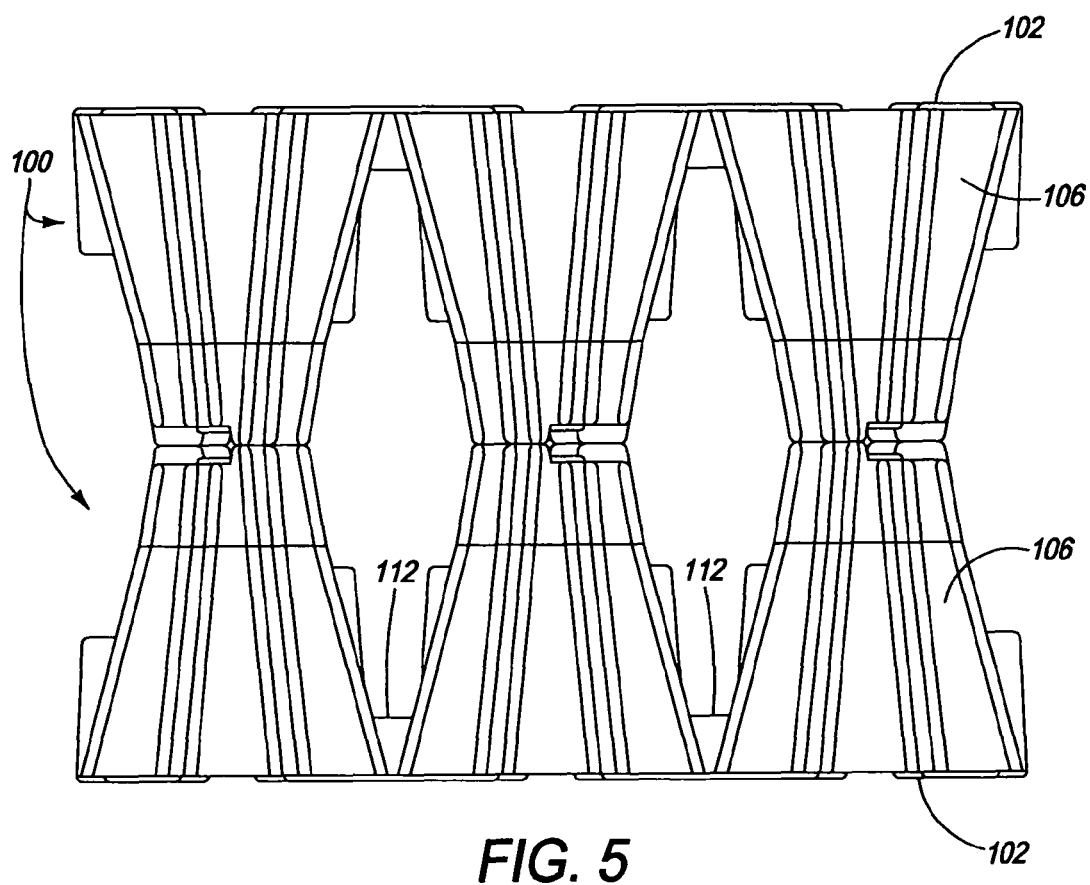
FIG. 5 is a side view of spacing members of FIG. 1 in an operative position.

At the plane where the conical frustums 104 terminate, slots 110 are located within each of the conical frustums 104. Typically, these slots 110 are symmetrically arranged in a manner such that the slots 110 are able to receive a corresponding and complementary conical frustum 104 of another spacing member 100 in a face-to-face configuration, as shown in FIG. 5. In particular, slots 110 allow for the complementary spacing members 100, shown in FIG. 5, to lock with one another.

When placed within a bulkhead or in a storage container, the combination of the structure and materials used provide a number of advantageous qualities. In particular, spacer member 100 combined into a system, as shown in FIG. 5, can withstand a very large load, typically compressive loads, across the planar member 102 in excess of 21,000 pounds. Additionally, the spacer member is designed so as to have a small amount of compressive deflection, typically no more than 2.5 inches. A spacer member 100 may also function as a single unit with a plastic or fiber separator pad positioned to face the conical frustums 104 and compressed against the shipping container wall. Two or more pairs of spacing members 100 can also be used with one another in combination.

Since the spacing members 100 engage one another to lock in a face-to-face configuration, there are several other additional advantages. Specifically, this locking feature can be bi-directional, making part orientation irrelevant. Moreover, the locking feature can be adjusted so as to be implemented under various loads, for example with no more than 150 pounds static load and no less than 50 pounds static load placed over any corner of the pair of spacing members 100.

Moreover, because the conical frustums 104 are hollow, the interiors of the conical frustums 104 are accessible through openings (not shown) within the planar member 102. These openings (not shown) allow for the spacing members 100 to be stacked on top of one another. This stackability or nestability reduces the amount of space required for storing the spacing members when not in use. Anti-jam ledges (not shown) can also be located within the conical frustrums to assure ease of denesting. Moreover, individual or nested bulkhead stacks can be accessed and maneuvered by forklift on two flat ledges between the three conical frustums 104. Another advantage is that rotation of one spacer on top or beneath (180 degrees) should produce a vertical gap between bulkhead parts to enable separation and lift by fork truck blades.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

We claim:

1. A system for spacing comprising:
at least one pair of spacing members that face one another and that interlock with one another, wherein each spacing member includes:
a planar member having a first side and an opposite second side; and
a plurality of frustums extending from the first side of the planar member and terminating at an upper plane that is substantially parallel to the planar member, wherein each frustum includes a side conical surface having at least one groove formed therein and being generally orthogonal to the planar member, and at least one slot formed in an upper surface bordered by the upper plane that is adapted to allow each frustum to interlock with another frustum.

2. The system of claim 1, wherein the frustums are substantially conical.

3. The system of claim 2, wherein the first side of the planar member has a corrugated surface.

4. The system of claim 1, each spacing member further comprising a cross member interconnecting the plurality of frustums.

5. A spacing member comprising:
a planar member having a first side and an opposite second side;
a plurality of frustums extending from the first side of the planar member having a frustoconical surface terminating at an upper plane that is substantially parallel to the planar member; and
a cross member interconnecting the plurality of frustums, wherein each frustum includes at least one slot formed in an upper surface bordered by the upper plane and adapted to enable interlocking of the frustum with a frustum of another spacing member, wherein the frusto-conical surface of each frustum is corrugated.

6. A spacing member comprising:
a planar member having a first side and an opposite side; and
a plurality of frustums, each frustum having an axis and including:
   a lower conical surface extending from the first side of the planar member at a first angle relative to the planar member;
   an upper conical surface extending from the lower conical surface at a second angle relative to the planar member, wherein the second angle is different from the first angle;
   an upper plane surface intersecting the upper conical surface and substantially parallel to the planar member, the upper plane surface having at least one slot formed therein that is configured to allow each frustum to interlock with another frustum; and
   at least one groove formed in at least one of the conical surfaces and extending axially.

7. The spacing member of claim 6, wherein the frustums are substantially conical.

8. The spacing member of claim 6, wherein the first side of the planar member has a corrugated surface.

9. The spacing member of claim 6, wherein the opposite side of the planar member has a corrugated surface.

10. The spacing member of claim 6 further comprising a cross member interconnecting the plurality of frustums.

* * * * *